United States Patent [19]
Fox et al.

[11] Patent Number: 5,573,454
[45] Date of Patent: Nov. 12, 1996

[54] METHOD AND APPARATUS FOR ALIGNING LABELS ON SHIRRED FOOD CASINGS

[75] Inventors: Mark L. Fox, Pleasant Valley; Mark D. Kelley, Kansas City, both of Mo.

[73] Assignee: Devro-Teepak, Inc., Westchester, Ill.

[21] Appl. No.: 261,659

[22] Filed: Jun. 17, 1994

[51] Int. Cl.$^6$ ............................................ A22C 13/00
[52] U.S. Cl. ............................................ 452/29; 452/48
[58] Field of Search .......................... 452/48, 29, 31, 452/46

[56] References Cited

U.S. PATENT DOCUMENTS

| | | | |
|---|---|---|---|
| 2,949,371 | 8/1960 | Freund, II et al. | 99/176 |
| 3,112,516 | 12/1963 | Bonnee | 452/46 |
| 4,017,941 | 4/1977 | Raudys et al. | 452/48 |
| 4,044,426 | 8/1977 | Kupcikevicius et al. | 452/48 |
| 4,580,316 | 4/1986 | Kollross | 452/48 |
| 4,625,362 | 12/1986 | Kollross | 452/48 |
| 4,991,260 | 2/1991 | Nausedas | 452/45 |
| 5,372,537 | 12/1994 | Stiles | 452/51 |
| 5,405,288 | 4/1995 | Stanley | 452/48 |

Primary Examiner—Willis Little
Attorney, Agent, or Firm—Michael L. Dunn

[57] ABSTRACT

In a method for the continuous automated manufacture of stuffed food casings containing imprinted labels, wherein tubular material for the casings from a supply source is axially shirred into sections and the sections are stuffed with food emulsion into divided off portions, the improvement comprising measuring linear motion of the casing as the portions are filled with food emulsion; inputting the measured motion to a programmable logic controller; within the programmable logic controller, calculating an approximate distance between eye-mark bars separating the individual portions, where the calculation is based upon a known distance between eye-mark bars; based upon the calculated approximate distance and the measured motion, selectively sensing eye-mark bars which separate individual casings while ignoring printed label material between eye-mark bars; and, clipping individual sections of the casing closed at precise locations in response to the sensing of eye-mark bars to accurately position the labels between end-clips secured to ends of each of the portions.

8 Claims, 6 Drawing Sheets

Microfiche Appendix Included
(108 Microfiche, 2 Pages)

METHOD AND APPARATUS FOR ALIGNING LABELS ON SHIRRED FOOD CASINGS

MICROFICHE APPENDIX

A microfiche appendix comprising 108 frames, in accordance with 37 C.F.R. 1.96, is to be considered part of the specification of this patent.

BACKGROUND OF THE INVENTION

The invention relates generally to the control of a machine for automatically sizing and filling food casings, and, more particularly, to a method and apparatus for aligning labels on shirred food casings as the casings are being filled and clipped.

Food products such as sausage and other processed meats, cheese, sandwich spreads and the like are often packaged in tubular casings which are tied, clipped or otherwise secured at both ends. Larger size packages (e.g., one to three pounds) are known in the industry as chub packages.

Chub packages are typically made of fibrous material, polyethylene film, saran film, or a combination of polyethylene film and saran film. The film is typically stored on a roll, and is shirred into strands prior to filling. Usually two or more plies of film are used, and at least one ply is imprinted with information about the product. Thus, the film functions both as a package and as a permanent label for the product.

The shirred casing strands are placed on the stuffing horn and sizing ring of an automatic sizing and stuffing machine. The leading end of the first casing is clipped closed and food, in the form of an emulsion, is pumped through the stuffing horn. As each casing is filled, the shirred casing is pulled off the stuffing horn by the force of the food flow. Each casing is clipped to make individual chub packages. It is desirable that the imprinted label be centered between the end clips of each filled casing.

Various methods and machines are known in the art related to the controlling of machines which shirr and/or fill food casings. In U.S. Pat. No. 2,949,371 (Freund II, et al.), for example, a method and apparatus are disclosed for distinguishing between encased and skinless frankfurters. The invention incorporates longitudinal regenerated cellulose stripes in sausage casings, which stripes have characteristics different than the casing cellulose itself. The stripes are detectable and are used to distinguish encased frankfurters from skinless frankfurters. This patent does not address the additional problem of centering a label imprinted on an individual casing.

U.S. Pat. No. 3,112,516 (Bonnee) discloses a control for a shirring machine which uses a mechanical means to detect a splice in unshirred casing. Again, this patent is not concerned with casings having labels and with the problem of centering the labels between end clips.

U.S. Pat. No. 4,580,316 (Kollross) discloses a machine for automatically manufacturing shirred sausage casings which includes means for measuring register marks on the casings. However, the shirred casings of this invention do not include imprinted labels and hence there is no problem of interference between the register marks and a label.

U.S. Pat. No. 4,625,362 (Kollross et al.) discloses a method and device for automated manufacture of strings of sausages which incorporates a photocell for sensing sealing joints in shirred casings. However, the shirred casings of this invention are not imprinted with labels, and hence there is no interference problem between the sealing joints and the labels.

It has previously been impossible to accurately center printed blocks between endclips applied by automatic sizing machines. Such machines typically used product length, elapsed time, or pump metered portioning of products to control chub size. None of these methods accurately provides for centering printed blocks between endclips. Thus, a need has existed for a method and apparatus for centering imprinted labels on filled food casings between endclips, which casings are shirred prior to filling.

SUMMARY OF THE INVENTION

The invention broadly relates to a method for the continuous automated manufacture of stuffed food casings containing imprinted labels, wherein tubular material for the casings from a supply source is axially shirred into sections and the sections are stuffed with food emulsion into divided off portions, and comprises the improvement of measuring linear motion of the casing as the portions are filled with food emulsion; inputting the measured motion to a programmable logic controller; within the programmable logic controller, calculating an approximate distance between eye-mark bars separating the individual portions, where the calculation is based upon a known distance between eye-mark bars; based upon the calculated approximate distance and the measured motion, selectively sensing eye-mark bars which separate individual casings while ignoring printed label material between eye-mark bars; and, clipping individual sections of the casing closed at precise locations in response to the sensing of eye-mark bars to accurately position the labels between end-clips secured to ends of each of the portions. An apparatus operatively arranged to implement the method of the invention is also provided.

A primary object of the invention is to provide a method and apparatus for centering labels between endclips of filled food casings.

A secondary object is to provide a method and apparatus for centering labels between ends of filled food casings which does not require precise placement of the casing on a horn ring of a filling machine.

These and other objects and advantages of the present invention are efficiently obtained, and will become apparent from the specification, drawings and appended claims.

BRIEF DESCRIPTION OF THE DRAWINGS

FIG. 7 is a view similar to that of FIG. 2 except showing the trailing end of the filled casing being clipped and cut at the eye-mark bar, and also illustrating the leading end of a subsequent casing being clipped as the process begins anew.

Detailed Description of the Invention

Figure 1:
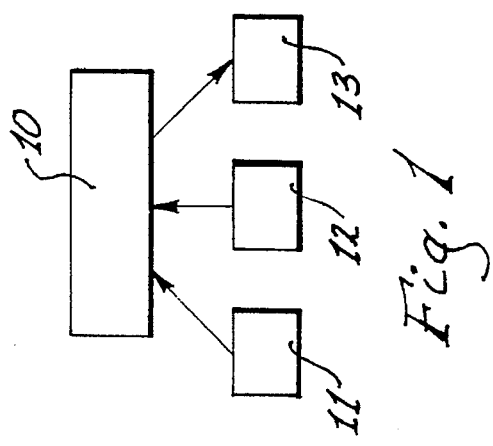
FIG 1 is a block diagram which illustrates how the programmable logic controller controls the operations of the present invention.

At the outset, it should be clearly understood that like reference numerals are intended to identify the same structural elements, portions or surfaces consistently throughout the several drawing figures, as such elements, portions or surfaces may be further described or explained by the entire written specification. The drawings are intended to be read together with the specification, and are intended to be considered a portion of the entire "written description" of this invention. As used in the following description, the phrases "right " and "left", and "clockwise", as well as adjectival and adverbial derivatives thereof (e.g., "rightwardly" and "leftwardly", etc.) , refer to the relative orientation of the structure of the invention from the perspective of one facing FIG. 2.

The invention broadly relates to a method for the continuous automated manufacture of stuffed food casings containing imprinted labels, wherein tubular material for the casings from a supply source is axially shirred into sections and the sections are stuffed with food emulsion into divided off portions, and comprises the improvement of measuring linear motion of the casing as the portions are filled with food emulsion; inputting the measured motion to a programmable logic controller; within the programmable logic controller, calculating an approximate distance between eye-mark bars separating the individual portions, where the calculation is based upon a known distance between eye-mark bars; based upon the calculated approximate distance and the measured motion, selectively sensing eye-mark bars which separate individual casings while ignoring printed label material between eye-mark bars; and, clipping individual sections of the casing closed at precise locations in response to the sensing of eye-mark bars to accurately position the labels between end-clips secured to ends of each of the portions. An apparatus operatively arranged to implement the method of the invention is also provided.

It should be understood that the apparatus of the invention is an improvement to existing and well known food filling machines. In the preferred embodiment described herein, the improvement is mounted to a sausage filling machine.

Quite simply, the invention comprises a programmable logic controller (PLC) in communication with optical sensing means which sense eye-mark bars on casings to be filled, mechanical sensing means which measure the rate of motion of the casings, and clipping and cutting means which, in response to commands from the PLC, cut and clip the casing at precise locations to center a printed label between eye-mark bars on the individual casing portion.

FIG. 1 illustrates a block diagram of the present invention. The heart of the invention is programmable logic controller 10 (model TI-335 , or equivalent). The software necessary to run the PLC is listed in the Microfiche Appendix.

The PLC receives signals from optical sensor 11 (SUNX FX-77, Des Moines, Iowa, or equivalent) which senses the eye-mark bars on the casing. The PLC also receives signals from mechanical sensing means 12 which measures the rate of the motion of the casing as it moves over the stuffing horn. In response to the sensed eye-marks and the sensed motion, the PLC sends a control signal to the crimper/cutter mechanism 13 which applies endclips to the leading and trailing ends of individual filled casings, which endclips are applied precisely proximate (on either side of) the eye-mark bars. Mechanism 13 also cuts the casing material between the trailing endclip of one casing portion and the leading endclip of the next casing portion. The cutting is done precisely at the eye-mark bar.

Figure 2:
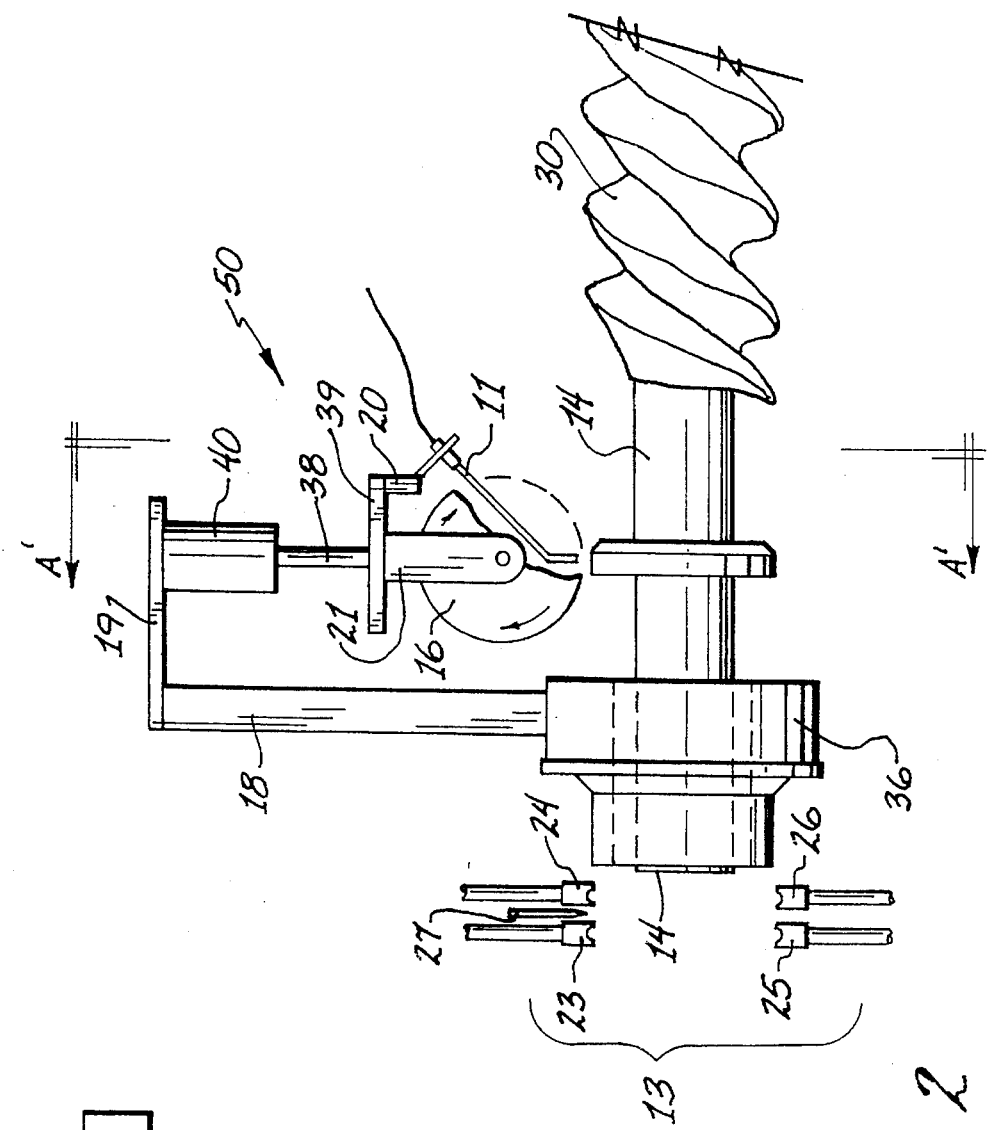
FIG. 2 is a side elevation of the apparatus of the invention, showing a shirred casing installed over the stuffing horn, but pulled back to reveal the horn ring and stuffing horn.

FIG. 2 is a side elevation of the apparatus 50 of the invention, showing a shirred casing portion 30 installed over the stuffing horn 14, but pulled back to reveal the horn ring 15 and stuffing horn. The casing material is tubular in shape and is initially stored on a supply reel (not shown). Also shown is brake ring assembly 36, index wheel 16, trailing endclip installers 23 and 25, leading endclip installers 24 and 26, and cutter 27. Index wheel 16 is partially broken away to reveal optical sensor 11.

Figure 3:
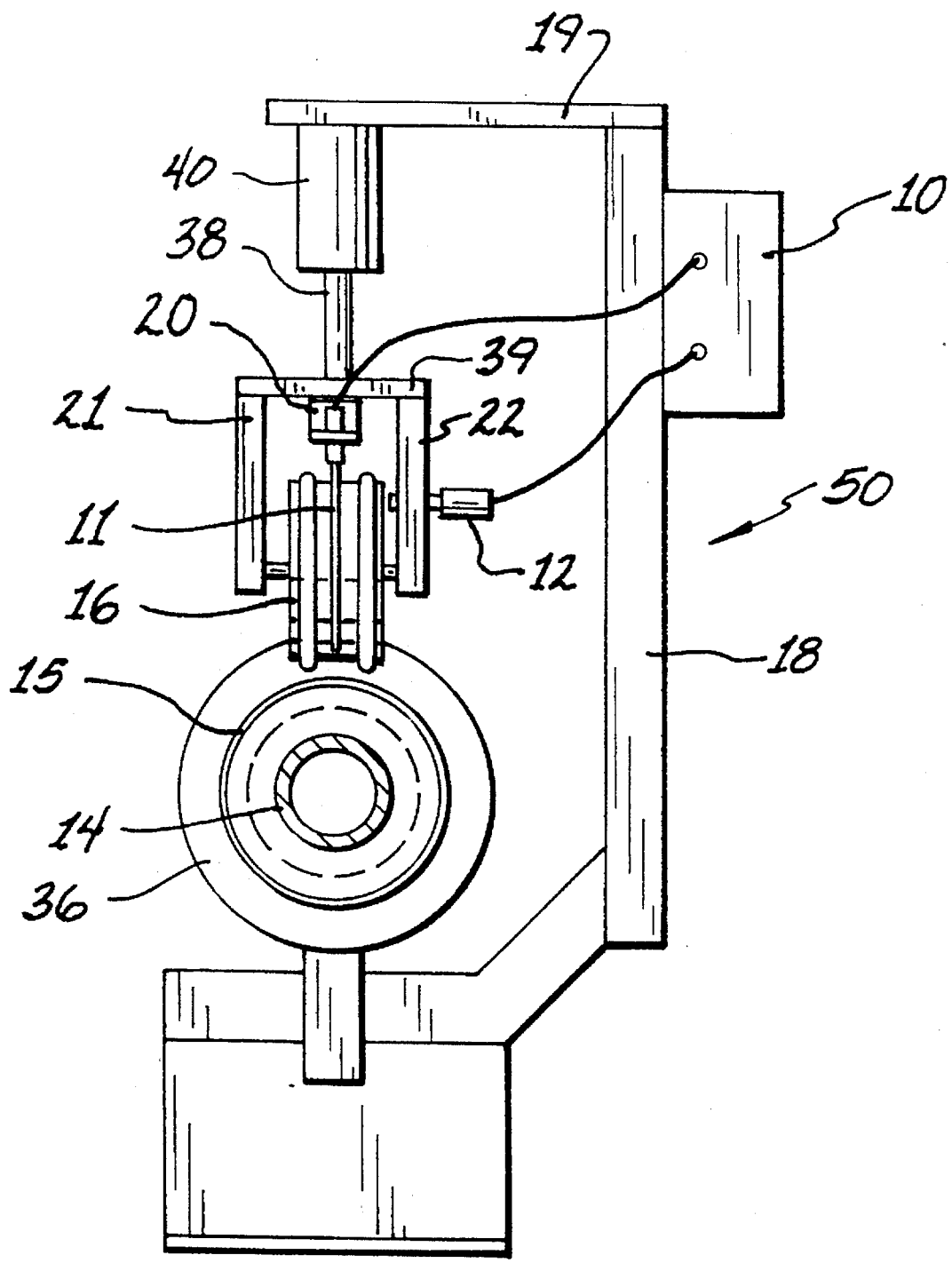
FIG. 3 is a partial cross-sectional view taken generally along line A'—A' of FIG. 2.

FIG. 3 is a partial cross-sectional view taken generally along line A'—A' of FIG. 2. Index wheel 16 is shown supported by vertical support members 21 and 22, which, in turn, are supported by horizontal member 39 which, in turn, is mounted to piston 38 of pneumatic cylinder 40. Cylinder 40 is mounted to top horizontal support member 19 which is mounted to the filling machine by vertical support member 18. The index wheel is brought into contact with horn ring 15 by pneumatic cylinder 40, which is driven by a 25psi source and is pressure regulated to ensure that the wheel turns in a 1:1ratio as the casing moves over the horn ring. The necessary pressure is determined experimentally and may vary depending upon the diameter and coefficient of friction of the casing and horn ring. Obviously, too much pressure would tend to brake the casing, and too little pressure would result in the casing slipping with respect to the index wheel.

In a preferred embodiment, index wheel 16 is approximately 12inches in diameter and is divided into eighteen (18) pie sections (other diameter wheels and different pie section configurations may be used as well.) Index wheel 16 is coupled to proximity sensing device 12 which generates 24VDC (volts direct current) pulses as the wheel rotates. The PLC uses these pulses to determine the rotational speed of the wheel and the rate of linear motion of the casing.

Figure 4:
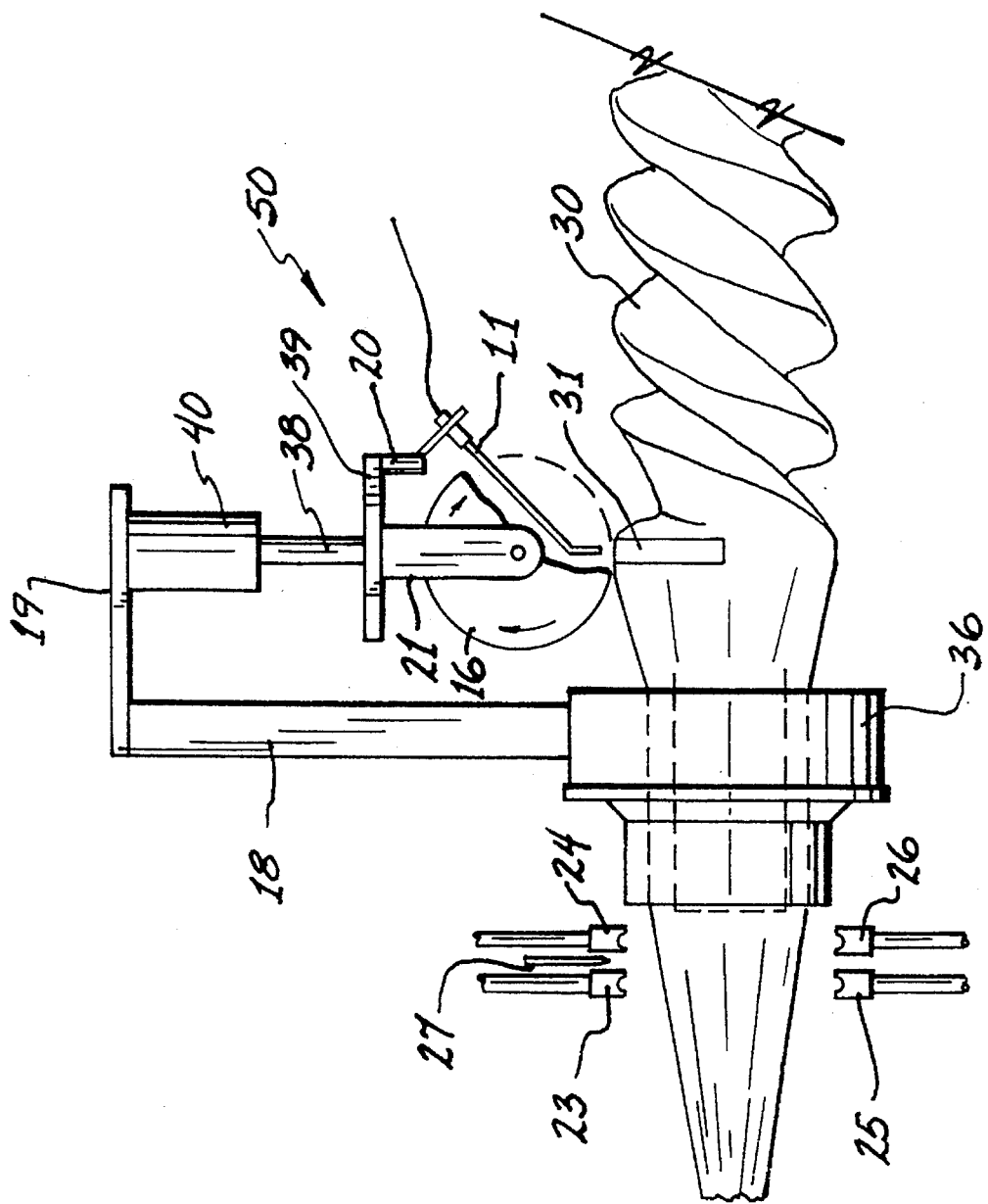
FIG. 4 is a view similar to that of FIG. 2 except showing the casing pulled over the horn ring to align an eye-mark bar with the sensing means, and also showing the leading end of the casing in postion for clipping.

FIG. 4 is a view similar to that of FIG. 2 except showing the casing portion 30 pulled over the horn ring 15 (shown in FIGS. 2 and 3) to align eye-mark bar 31 with sensing means 11, and also showing the leading end of the casing in position for clipping under clipping means 24 and 26. Clipping means 24 and 26 apply an endclip to the leading end of a casing portion, whereas clipping means 23 and 25 apply an endclip to the trailing end of a casing portion. Cutting means 27 is located between the leading and trailing clipping means and functions to cut the casing material at the eye-mark bar between filled casing portions, in response to a command from the PLC.

In operation, the fixed length between eye-mark bars is manually programmed into the PLC. The starting point is then read into the PLC, which is the point where the first eye-mark bar is aligned with optical sensor 11 as shown in FIG. 4.

Figure 5:
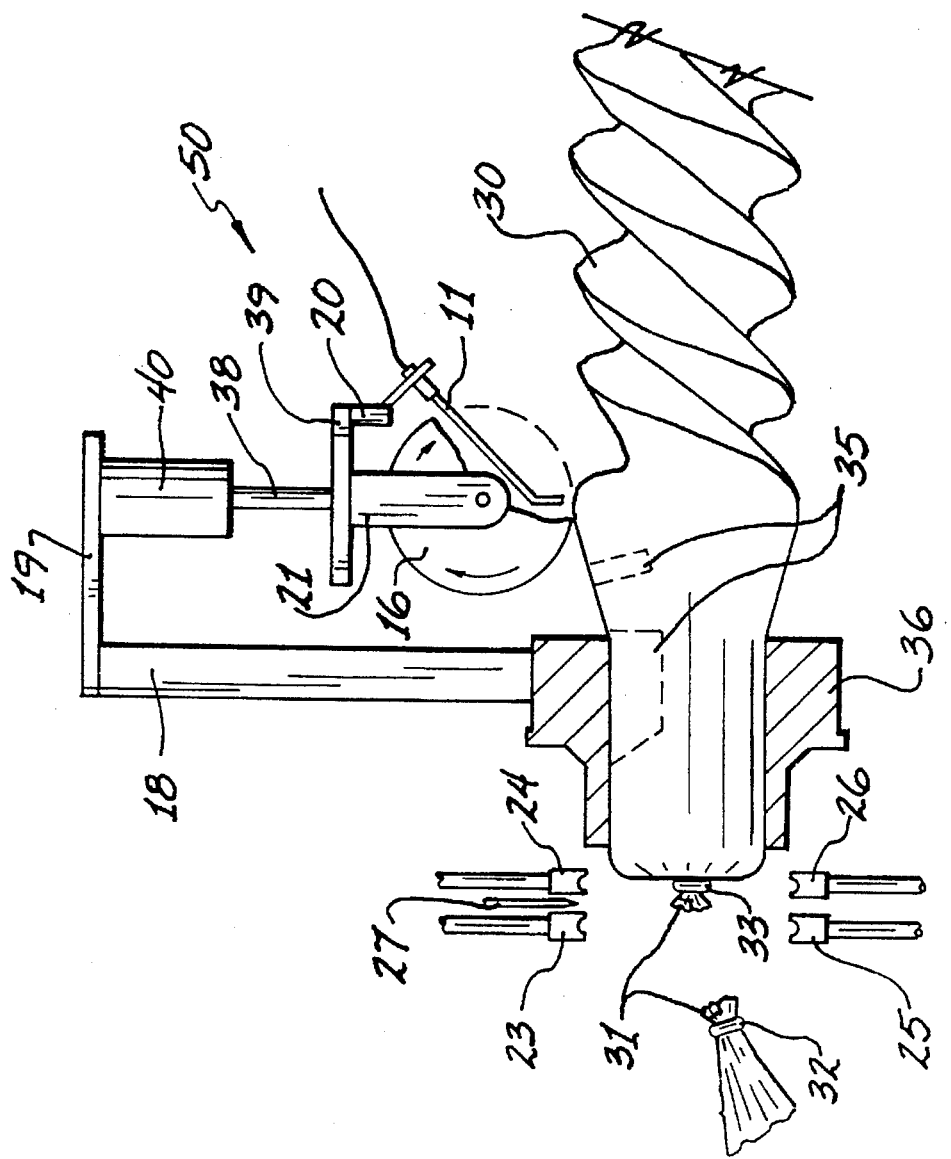
FIG. 5 is a view similar to that of FIG. 2 except showing the endclip secured to the leading end of the casing at the eye-mark bar, and illustrating how the casing proceeds from right to left in the machine.

To commence operation, initially, the casing is manually advanced, and trailing end-clip 32 and leading end-clip 33 are applied as shown in FIG. 5, and the casing material is cut by cutter 27 at eye-mark bar 31. Once casing portion 30 is clipped on its leading end, food emulsion pumped through stuffing horn 14 (shown in FIGS. 2 and 3) causes the casing portion to move leftwardly over the stuffing ring, over the horn ring, and under brake ring 36 (shown in cross-section in FIG. 5.) Index wheel 16 rotates in a clockwise direction from the perspective of one facing FIG. 5, and, as it rotates, the PLC measures the linear rate of motion of the casing. Optical sensor 11 is always active, but the PLC is programmed to ignore the printed label material between eye-mark bars. The PLC is programmed to look for the eye-mark bars within a certain distance window. In a preferred embodiment, this window may be four inches in length, and may be programmed to begin at a point equal to the length of an individual casing portion minus two inches (assuming a total individual casing portion length of thirty inches.)

Figure 6:
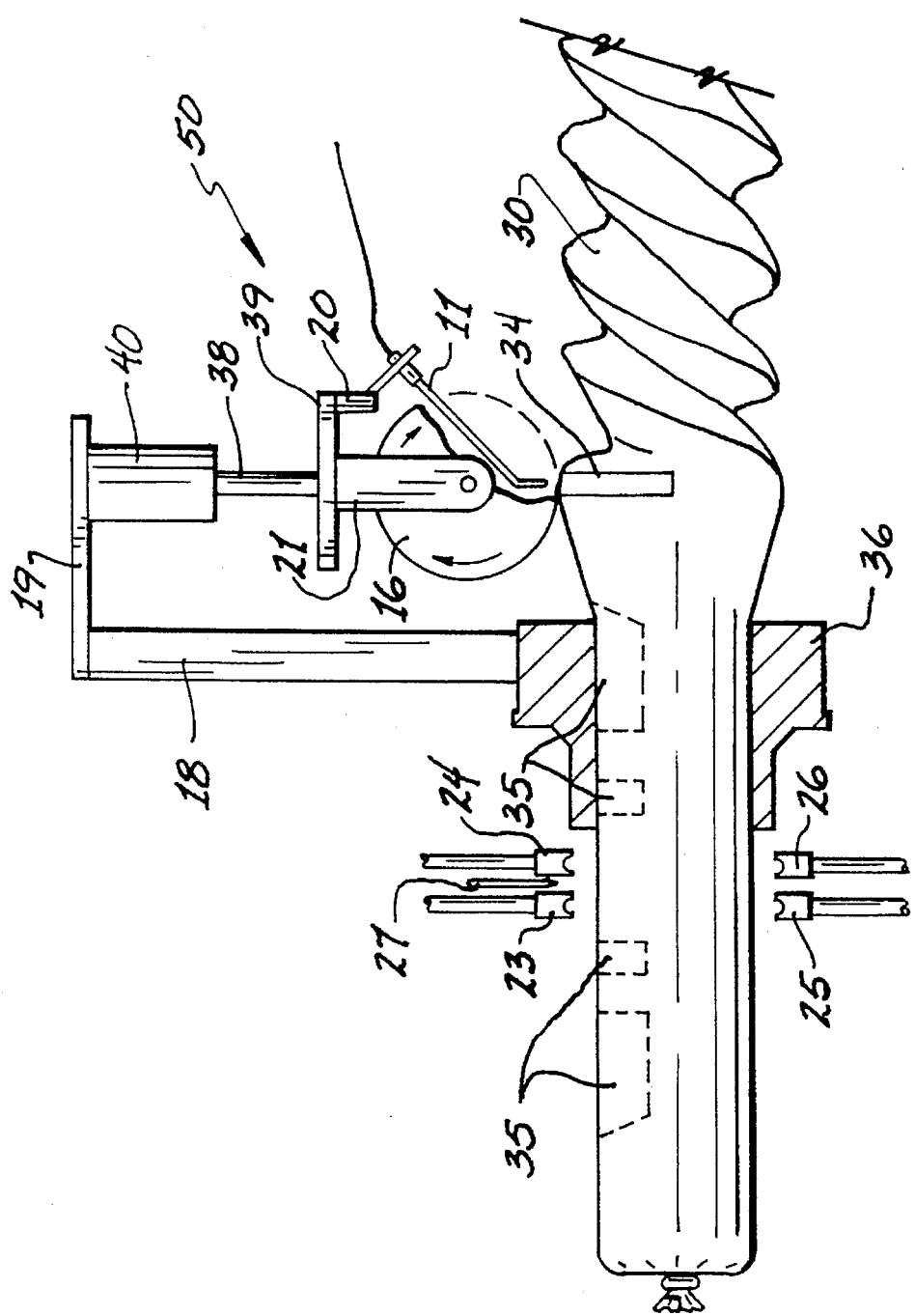
FIG. 6 is a view similar to that of FIG. 2 except with the trailing eye-mark bar aligned under the sensing means, as the casing continues to be filled with food emulsion, and continues to move from right to left.
Figure 1:
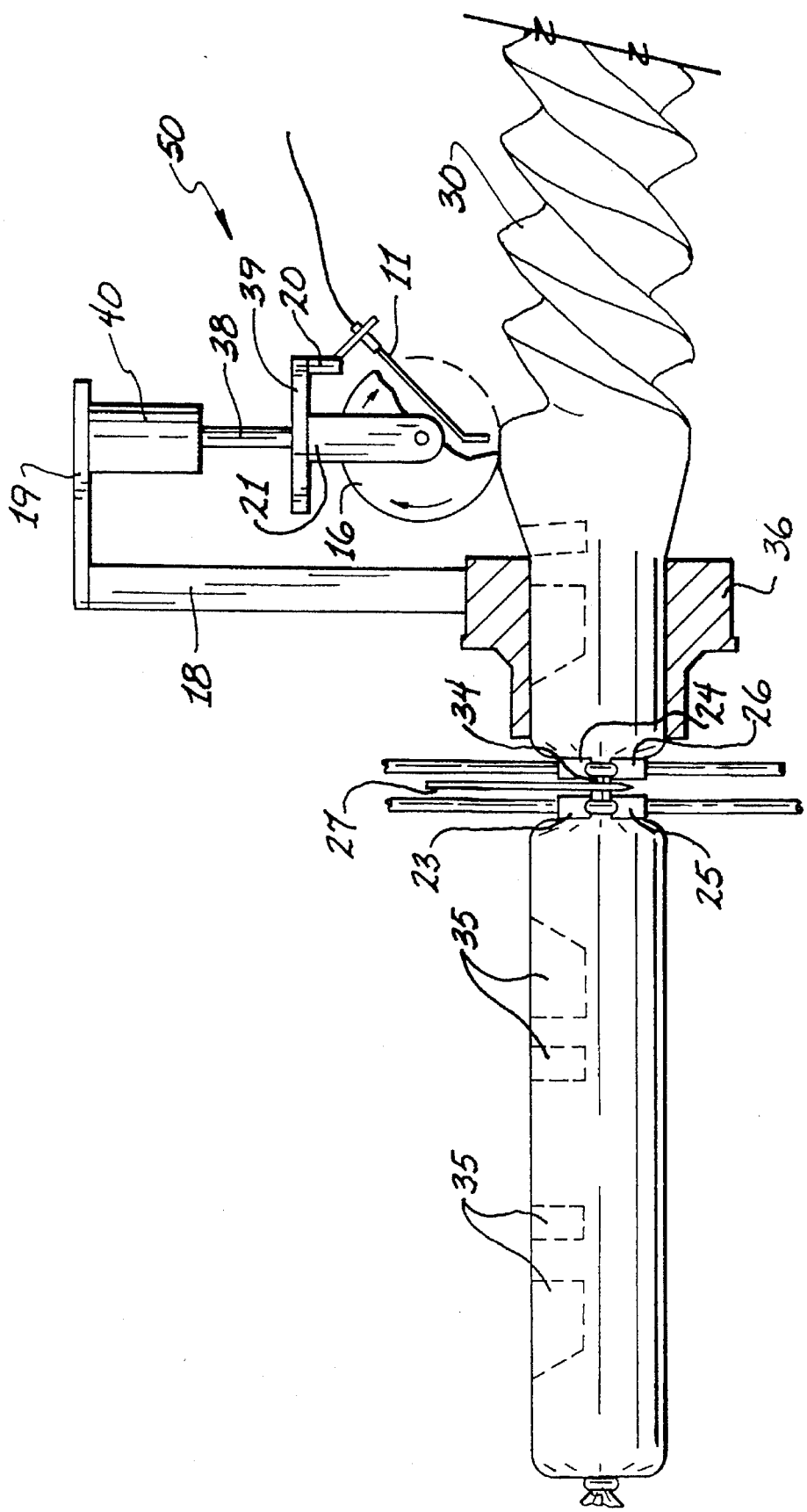

FIG. 6 is a view similar to that of FIG. 2 except with trailing eye-mark bar 34 aligned under the sensing means, as the casing portion continues to be filled with food emulsion, and continues to move from right to left. This figure clearly shows how label 35 is being centered between the leading clipped end of the casing portion and the trailing end defined by eye-mark bar 34. As optical sensor 11 senses eye-mark bar 34, the PLC processes a command to the clipper and cutter to precisely clip the casing and to cut it at eye-mark bar 34.

FIG. 7 is a view similar to that of FIG. 2 except showing the trailing end of the filled casing portion being clipped and cut at eye-mark bar 34, and also illustrating the leading end of a subsequent casing portion being clipped as the process begins anew. Label 35 is centered perfectly between the ends of the stuffed casing portion.

Although the present invention has been described herein with a certain degree of particularity, it is to be understood that the present disclosure has been made as an exemplification of the preferred embodiment of the present invention, and the scope thereof is not considered limited by that description, but rather, is defined by what is hereinafter claimed.

What is claimed is:

1. In a method for the continuous automated manufacture of stuffed food casings containing imprinted labels, wherein tubular material for said casings from a supply source is axially shirred into sections and said sections are stuffed with food emulsion into divided off portions, the improvement comprising:

measuring linear motion of said casing as said portions are filled with food emulsion;

inputting said measured motion to a programmable logic controller;

within said programmable logic controller, calculating an approximate distance between eye-mark bars separating said individual portions, where said calculation is based upon a known distance between eye-mark bars;

based upon said calculated approximate distance and said measured motion, selectively sensing eye-mark bars which separate individual casings while ignoring printed label material between eye-mark bars; and, clipping individual sections of said casing closed at precise locations in response to said sensing of eye-mark bars to accurately position said labels between end-clips secured to ends of each of said portions.

2. The method of claim 1 wherein said measuring of linear motion of said casing as said portions are filled with food emulsion is done with an index wheel which rotates at a rate directly proportional to said linear motion, and with a proximity sensor which measures the rotational movement of the wheel.

3. The method of claim 1 wherein said sensing is done with a fiber optic sensing means.

4. The method of claim 1 comprising the further step of cutting said casing material precisely at said eye-mark bars to separate individual casing portions.

5. In an apparatus for the continuous automated manufacture of stuffed food casings containing imprinted labels, wherein tubular material for said casings from a supply source is axially shirred into sections and said sections are stuffed with food emulsion into divided off portions, the improvement comprising:

means for measuring linear motion of said casing as said portions are filled with food emulsion;

means for sensing printed material on said casing;

a programmable logic controller operatively arranged to calculate an approximate distance between eye-mark bars separating said individual portions, where said calculation is based upon a known distance between eye-mark bars, and for selectively sensing eye-mark bars which separate individual casings based upon said calculated approximate distance and said measured motion, while ignoring printed label material between eye-mark bars; and, means for clipping individual sections of said casing closed at precise locations in response to said sensing of eye-mark bars to accurately position said labels between end-clips secured to ends of each of said portions.

6. The apparatus of claim 5 wherein said means for measuring linear motion of said casing as said portions are filled with food emulsion comprises an index wheel which rotates at a rate directly proportional to said linear motion, and a proximity sensor which measures the rotational movement of the wheel.

7. The apparatus of claim 5 wherein said means for sensing printed material comprises a fiber optic sensing means.

8. The apparatus of claim 5 further comprising means for cutting said casing material precisely at said eye-mark bars to separate individual casing portions.

\* \* \* \* \*